US012122982B2

(12) United States Patent
Hunt, Jr. et al.

(10) Patent No.: US 12,122,982 B2
(45) Date of Patent: Oct. 22, 2024

(54) CLEANING COMPOSITIONS AND METHODS FOR REMOVING BAKED ON GREASE FROM FRYERS AND OTHER HOT SURFACES

(71) Applicant: ECOLAB USA INC., Saint Paul, MN (US)

(72) Inventors: Clinton Hunt, Jr., Saint Paul, MN (US); Benjamin Conway, Saint Paul, MN (US); Victor Fuk-Pong Man, Saint Paul, MN (US); Nathan D. Peitersen, Saint Paul, MN (US); Tsvetelina Baryakova, Saint Paul, MN (US); Owen Kinsky, Saint Paul, MN (US); Kimberly D'Aloia, Saint Paul, MN (US); Deborah Ihns, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 430 days.

(21) Appl. No.: 17/446,748

(22) Filed: Sep. 2, 2021

(65) Prior Publication Data

US 2021/0403838 A1 Dec. 30, 2021

Related U.S. Application Data

(62) Division of application No. 16/205,510, filed on Nov. 30, 2018, now Pat. No. 11,136,536.

(Continued)

(51) Int. Cl.

*C11D 3/00* (2006.01)
*C11D 1/66* (2006.01)

(Continued)

(52) U.S. Cl.

CPC .............. *C11D 3/222* (2013.01); *C11D 1/662* (2013.01); *C11D 3/0057* (2013.01); *C11D 3/10* (2013.01);

(Continued)

(58) Field of Classification Search

CPC ............................ C11D 3/222; C11D 11/0023

See application file for complete search history.

(56) References Cited

U.S. PATENT DOCUMENTS 4,372,788 A * 2/1983 Lancz ................. C11D 3/0057 134/40
5,080,822 A 1/1992 VanEenam (Continued)

FOREIGN PATENT DOCUMENTS

JP 2289697 A 11/1990
JP 812992 A 1/1996

(Continued)

OTHER PUBLICATIONS

Ecolab USA Inc., PCT/US2018/063400 filed Nov. 30, 2018, "The International Search Report and the Written Opinion of the International Searching Authority, or the Declaration", 14 pages, mailed Feb. 15, 2019.

*Primary Examiner* — Necholus Ogden, Jr.
(74) *Attorney, Agent, or Firm* — McKee, Voorhees & Sease, PLC

(57) ABSTRACT

Cleaning compositions and methods of use thereof for cleaning fryers and other hard surfaces soiled by grease, shortening, oils and other soils commonly encountered in the food service industry are disclosed. Cleaning compositions and methods of use which beneficially remove soils from vertical and/or inverted surfaces, reduce the cleaning time required for removing such difficult to remove and baked on soils, reduce exposure to hot surfaces by allowing cleaning at or near room temperature, reduce exposure to (Continued)

caustic chemicals, and/or eliminate the need for personal protective equipment (PPE) for use of the cleaning compositions are disclosed.

6 Claims, 3 Drawing Sheets

Related U.S. Application Data

(60) Provisional application No. 62/593,337, filed on Dec. 1, 2017.

(51) Int. Cl.

| | |
|---|---|
| ***C11D 3/10*** | (2006.01) |
| ***C11D 3/22*** | (2006.01) |
| ***C11D 3/30*** | (2006.01) |
| *B08B 1/12* | (2024.01) |
| *B08B 3/08* | (2006.01) |
| *C11D 1/12* | (2006.01) |
| *C11D 1/22* | (2006.01) |
| *C11D 3/43* | (2006.01) |

(52) U.S. Cl.

CPC ................ *C11D 3/225* (2013.01); *C11D 3/30* (2013.01); *B08B 1/12* (2024.01); *B08B 3/08* (2013.01); *C11D 1/12* (2013.01); *C11D 1/123* (2013.01); *C11D 1/22* (2013.01); *C11D 1/66* (2013.01); *C11D 3/43* (2013.01); *C11D 2111/14* (2024.01)

(56) References Cited

U.S. PATENT DOCUMENTS

| | | | | |
|---|---|---|---|---|
| 5,080,831 | A | 1/1992 | VanEenam | |
| 5,158,710 | A | 10/1992 | VanEenam | |
| 5,380,454 | A | 1/1995 | Griepenburg et al. | |
| 5,419,848 | A | 5/1995 | VanEenam | |
| 5,540,865 | A | 7/1996 | Michael | |
| 5,585,341 | A | 12/1996 | Van Eenam | |
| 5,783,538 | A | 7/1998 | Totoki | |
| 5,786,319 | A | 7/1998 | Pedersen et al. | |
| 5,849,682 | A | 12/1998 | Van Eenam | |
| 5,922,665 | A | 7/1999 | Liu | |
| 5,977,042 | A | 11/1999 | Hernandez et al. | |
| 6,423,677 | B1 | 7/2002 | Van Eenam | |
| 6,544,942 | B1 | 4/2003 | Smith et al. | |
| 6,723,692 | B2 | 4/2004 | Foley et al. | |
| 6,784,148 | B2 | 8/2004 | Tadrowski et al. | |
| 6,916,773 | B2 | 7/2005 | Griese et al. | |
| 6,929,702 | B1 | 8/2005 | Motsenbocker | |
| 7,008,911 | B2 | 3/2006 | Griese et al. | |
| 7,053,037 | B2 | 5/2006 | Smith et al. | |
| 8,772,215 | B2 | 7/2014 | Ryther et al. | |
| 9,023,782 | B2 | 5/2015 | Peitersen et al. | |
| 10,071,034 | B2 | 9/2018 | Eppler et al. | |
| 2002/0069901 | A1 | 6/2002 | Evers | |
| 2002/0082185 | A1 | 6/2002 | Totoki | |
| 2002/0142931 | A1 | 10/2002 | DeNome et al. | |
| 2003/0125226 | A1 | 7/2003 | Lewis | |
| 2005/0282719 | A1 * | 12/2005 | Egan ........................ | C11D 3/37 510/183 |
| 2006/0079435 | A1 | 4/2006 | Bigorra Llosas et al. | |
| 2006/0113506 | A1 | 6/2006 | Man et al. | |
| 2006/0234890 | A1 | 10/2006 | Griese et al. | |
| 2007/0087952 | A1 | 4/2007 | Hei et al. | |
| 2007/0095003 | A1 | 5/2007 | Hei et al. | |
| 2007/0179073 | A1 | 8/2007 | Smith et al. | |
| 2008/0230095 | A1 | 9/2008 | McKechnie | |
| 2009/0093390 | A1 | 4/2009 | Gross et al. | |
| 2009/0226541 | A1 | 9/2009 | Scholz et al. | |
| 2010/0004152 | A1 | 1/2010 | Karagianni et al. | |
| 2010/0010284 | A1 | 1/2010 | Proudlock et al. | |
| 2010/0234271 | A1 | 9/2010 | Scheuing et al. | |
| 2010/0305014 | A1 | 12/2010 | Miralles et al. | |
| 2010/0317559 | A1 | 12/2010 | Ryther et al. | |
| 2010/0317560 | A1 | 12/2010 | Ryther et al. | |
| 2011/0105377 | A1 | 5/2011 | Manakopoulos et al. | |
| 2011/0212866 | A1 | 9/2011 | Rao et al. | |
| 2011/0237481 | A1 | 9/2011 | Vinson et al. | |
| 2011/0269657 | A1 | 11/2011 | Dihora et al. | |
| 2012/0071378 | A1 | 3/2012 | Gonzales et al. | |
| 2012/0128614 | A1 | 5/2012 | Rieth et al. | |
| 2012/0148751 | A1 | 6/2012 | Herdt et al. | |
| 2012/0165240 | A1 | 6/2012 | Finison et al. | |
| 2012/0204916 | A1 | 8/2012 | Laser et al. | |
| 2012/0295829 | A1 * | 11/2012 | Peitersen ................. | C11D 3/43 510/218 |
| 2013/0219643 | A1 | 8/2013 | Gonzales et al. | |
| 2014/0271928 | A1 | 9/2014 | Rehage | |
| 2015/0132831 | A1 | 5/2015 | Olinski et al. | |
| 2016/0002525 | A1 | 1/2016 | Wegner et al. | |
| 2016/0160196 | A1 | 6/2016 | Morant et al. | |

FOREIGN PATENT DOCUMENTS

| | | | |
|---|---|---|---|
| JP | 8165498 | A | 6/1996 |
| JP | 959677 | A | 3/1997 |
| JP | 2004143251 | A | 5/2004 |
| WO | 9109104 | A1 | 6/1991 |
| WO | 2010146544 | A2 | 12/2010 |
| WO | 2017172320 | A1 | 10/2017 |

* cited by examiner

CLEANING COMPOSITIONS AND METHODS FOR REMOVING BAKED ON GREASE FROM FRYERS AND OTHER HOT SURFACES

CROSS-REFERENCE TO RELATED APPLICATIONS

This application is a Divisional Application of U.S. Ser. No. 16/205,510, filed Nov. 30, 2018, which claims priority under 35 U.S.C. § 119 to provisional application Ser. No. 62/593,337, filed Dec. 1, 2017, herein incorporated by reference in its entirety.

FIELD OF THE INVENTION

The invention relates to cleaning compositions and methods of use thereof for cleaning fryers and other hard surfaces soiled by grease, shortening, oils and other soils commonly encountered in the food service industry. In particular, the cleaning compositions and methods of use beneficially remove soils from vertical and/or inverted surfaces, reduce the cleaning time required for removing such difficult to remove and baked on soils, reduce exposure to hot surfaces by allowing cleaning at or near room temperature, reduce exposure to caustic chemicals, and/or eliminate the need for personal protective equipment (PPE) for use of the cleaning compositions. The cleaning compositions beneficially cling to surfaces and penetrate difficult to remove soils. The cleaning compositions are non-abrasive and do not corrode treated surfaces.

BACKGROUND OF THE INVENTION

Current industry standards for cleaning fryers are to "boil out" the fryer with powdered or liquid ready to use cleaning compositions. This process is time consuming, requiring at least 45 to 60 minutes to perform the cleaning and is also tedious for the user as it requires multiple steps. As a result, many foodservice locations fail to clean their fryers regularly and results in baked on soils and damaged equipment. This can cause the need to replace equipment earlier that would be required with sufficient cleaning. This can also cause sanitary and other health concerns.

Greasy soils are also found on surrounding surfaces in foodservice locations, such as those often encountered on surfaces (e.g., floors, hoods, appliances (both interior and exterior surfaces), counter tops, shelves, walls, ceilings, and the like). One type of soil can be referred to as fresh, greasy soil, and the other type of soil can be referred to as baked-on soil. Fresh, greasy soils can result from the presence of fatty soil, which can comprise, for example, a neutral fatty acid triglyceride ester and similar neutral fats, and free fatty acids or salts thereof. The fatty acid salts can be formed from a cation such as sodium, calcium, magnesium, ferric, ferrous, and the like, or combinations thereof. These greasy soils are difficult to remove from horizontal surfaces, and more difficult to remove from vertical or inverted surfaces, such as found in the interior of ovens or hoods venting the fryer. This less effective cleaning is due in part to reduced contact time. That is, many oven and hood cleaners require a somewhat extended contact time in order to effectively remove the soils and grease from a surface. If the cleaner is applied to a vertical or inverted surface and does not adhere to the greasy or soiled surface for an effective amount of time to act on the grease or soil, it cannot effectively remove the grease or soil without the use of high pH cleaners or high vapor pressure solvents.

Accordingly, it is an objective of the claimed compositions and methods to develop cleaning compositions suitable for use in fryer cleaning, and in other objectives cleaning other hard surfaces soiled by grease, shortening, oils and other soils commonly encountered in the food service industry.

A further object of the claimed compositions and methods is to provide commercially suitable cleaning for removing soils from fryer surfaces, including vertical and/or inverted surfaces.

A further object of the claimed compositions and methods is to provide commercially suitable cleaning with the additional benefit of reducing cleaning time required for removing such difficult to remove and baked on soils. In some aspects, cleaning time can be reduced from about 45-60 minutes to about 25 minutes or less. A further object of the claimed compositions and methods is to provide commercially suitable cleaning that reduces exposure to hot surfaces by cleaning with the compositions at or near room temperature.

A still further object of the claimed compositions and methods is to provide commercially suitable cleaning while reducing exposure to caustic chemicals and/or eliminating the need for personal protective equipment (PPE). In an aspect, the methods and use of the cleaning compositions are safe to use without gloves or masks.

Other objects, advantages and features of the present invention will become apparent from the following specification taken in conjunction with the accompanying drawings.

BRIEF SUMMARY OF THE INVENTION

An advantage of the invention is cleaning compositions and methods of use thereof for cleaning fryers and other hard surfaces soiled by greasy soils with various additional performance benefits in comparison to commercially-available cleaners. It is an advantage of the present invention that soils are removed from vertical and/or inverted surfaces, cleaning time is reduced, exposure to hot surfaces is reduced, exposure to caustic chemicals is reduced, and/or the use of PPE, such as masks or gloves, is reduced or eliminated.

In an aspect, a cleaning composition comprises at least one rheology modifier; at least one alkalinity source, wherein the alkalinity source comprises less than 1 wt-% caustic source; at least one emulsifier, wherein the emulsifier is a surfactant, emulsifier and/or wetting agent; at least one solvent; and water and/or other carrier, wherein the composition has a pH less than about 11.5. In further aspects, the compositions include from about 0.3 to about 3 wt-% of the rheology modifier; from about 4 to about 25 wt-% of the at least one alkalinity source; from about 2 to about 20 wt-% of the emulsifier; from about 3 to about 40 wt-% of the solvent; and from about 5 to about 90 wt-% of the water or other carrier.

In an aspect, a method of cleaning a fryer or hard surface soiled with grease comprising: contacting a cleaning composition according to claim 1 to a fryer or hard surface soiled with grease; dispersing the cleaning composition into a homogenous alkaline dispersion to cling to the fryer or hard surface for a sufficient amount of time to emulsify grease and other soils; and wherein the cleaning is conducted at room temperature and requires less than about 25 minutes for the cleaning.

While multiple embodiments are disclosed, still other embodiments of the present invention will become apparent to those skilled in the art from the following detailed description, which shows and describes illustrative embodiments of the invention.

Accordingly, the drawings and detailed description are to be regarded as illustrative in nature and not restrictive.

Figure 1:
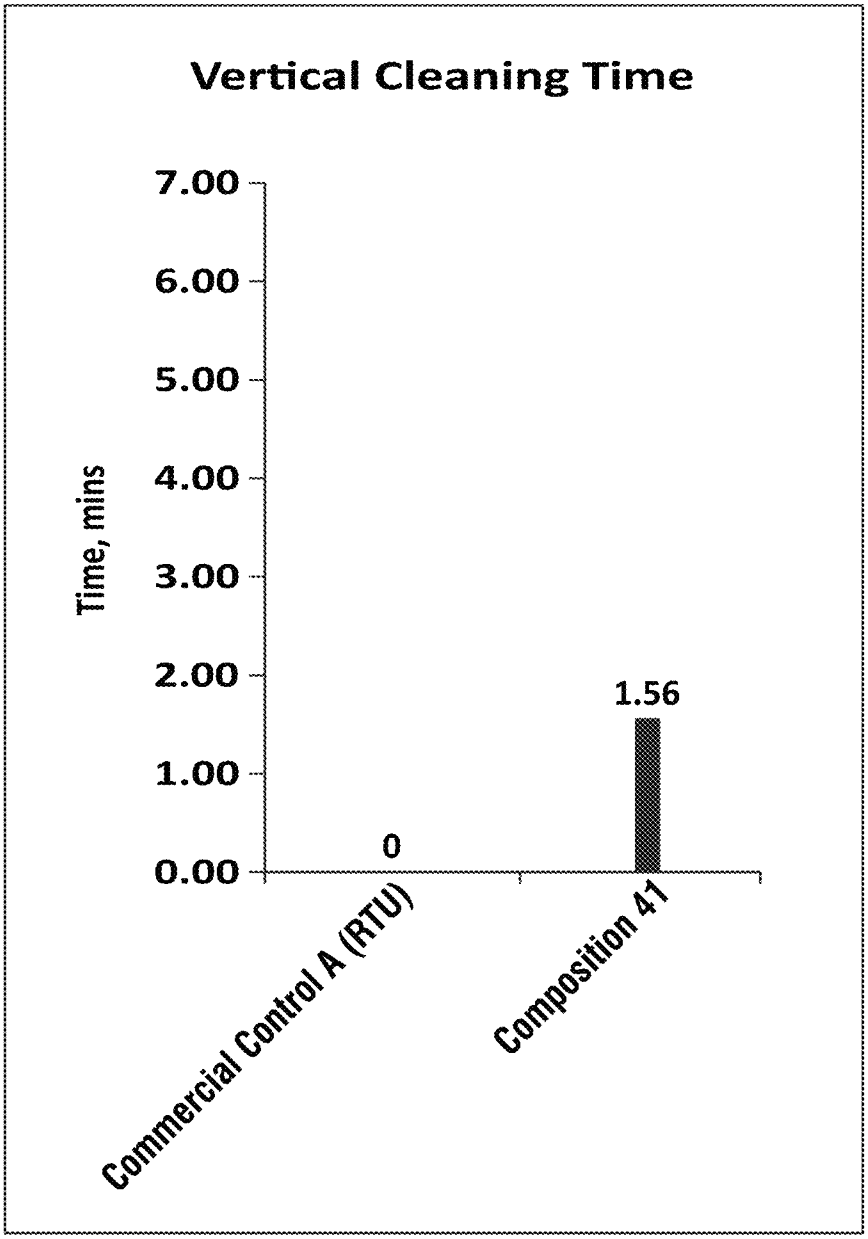
FIG. 1 shows a graph comparison of cleaning time (minutes) of an exemplary formulation for fryer cleaning compared to a Commercial Control.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to cleaning compositions and methods of employing the same. The embodiments of this invention are not limited to particular claimed compositions and conditions of use thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal, bleaching, microbial population reduction, rinsing, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The term "commercially acceptable cleaning performance" refers generally to the degree of cleanliness, extent of effort, or both that a typical consumer would expect to achieve or expend when using a cleaning product or cleaning system to address a typical soiling condition on a typical substrate. This degree of cleanliness may, depending on the particular cleaning product and particular substrate, correspond to a general absence of visible soils, or to some lesser degree of cleanliness. For example, a shower cleaner or toilet bowl cleaner would be expected by a typical consumer to achieve an absence of visible soils when used on a moderately soiled but relatively new hard surface, but would not be expected to achieve an absence of visible soils when used on an old hard surface which already bears permanent stains such as heavy calcite deposits or iron discoloration. Cleanliness may be evaluated in a variety of ways depending on the particular cleaning product being used and the particular surface being cleaned, and normally may be determined using generally agreed industry standard tests or localized variations of such tests. In the absence of such agreed industry standard tests, cleanliness may be evaluated using the test or tests already employed by a manufacturer or seller to evaluate the cleaning performance of its cleaning products sold in association with its brand.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

The terms "include" and "including" when used in reference to a list of materials refer to but are not limited to the materials so listed.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. More preferably, the amount of phosphate is less than 0.1 wt-%, and most preferably, the amount of phosphate is less than 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

As used herein, the term "free of volatile organic compounds" or "free of VOCs" refers to a composition, mixture, or ingredient that does not contain a volatile organic compound or to which a volatile organic compound has not been added. VOCs are defined by California code of Regulations Title 17 Sections 94507-94517 Amendment 2010 which definition is hereby incorporated by reference for all purposes. Should a volatile organic compound be present through contamination of a volatile organic compound-free composition, mixture, or ingredients, the amount of volatile organic shall be less than 0.5 wt %. More preferably, the amount of volatile organic compound is less than 0.1 wt %, and most preferably, the amount of volatile organic compound is less than 0.01 wt %.

As used herein, the term "soil" refers to polar or non-polar organic or inorganic substances including, but not limited to carbohydrates, proteins, fats, oils and the like. These substances may be present in their organic state or complexed to a metal to form an inorganic complex.

The term "solid" refers to a composition in a generally shape-stable form under expected storage conditions, for example a powder, particle, agglomerate, flake, granule, pellet, tablet, lozenge, puck, briquette, brick or block, and whether in a unit dose or a portion from which measured unit doses may be withdrawn. A solid may have varying degrees of shape stability, but typically will not flow perceptibly and will substantially retain its shape under moderate stress, pressure or mere gravity, as for example, when a molded solid is removed from a mold, when an extruded solid exits an extruder, and the like. A solid may have varying degrees of surface hardness, and for example may range from that of a fused solid block whose surface is relatively dense and hard, resembling concrete, to a consistency characterized as being malleable and sponge-like, resembling a cured caulking material.

As used herein, the term "substantially free" refers to compositions completely lacking the component or having such a small amount of the component that the component does not affect the performance of the composition. The component may be present than about 0.5 wt-%. In another embodiment, the amount of the component is less than about 0.1 wt-% and in yet another embodiment, the amount of component is less than about 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Cleaning Compositions

Exemplary embodiments of the cleaning compositions are shown in Table 1 in weight percentage of a liquid cleaning compositions, including concentrate and ready-to-use (RTU) liquid cleaning compositions. The thickened, viscous liquids remain liquid and do not form gels. The liquids are highly polar acquoues compositions.

TABLE 1

| Material | First Exemplary Range wt-% | Second Exemplary Range wt-% | Third Exemplary Range wt-% | Fourth Exemplary Range wt-% |
|---|---|---|---|---|
| Water and/or Other Carrier(s) | 5-90 | 10-90 | 10-85 | 20-85 |
| Alkalinity Source(s) | 1-50 | 4-25 | 4-20 | 4-10 |
| Rheology modifier(s) | 0.1-5 | 0.3-5 | 0.5-3 | 1-3 |
| Surfactant(s)/ emulsifier(s)/wetting agent(s) | 1-25 | 2-20 | 4-20 | 5-20 |
| Solvent(s) | 1-60 | 3-50 | 5-40 | 5-30 |
| Additional Functional Ingredient(s) | 0-30 | 0-25 | 0.1-25 | 0.1-20 |

The various cleaning compositions are formulated as concentrate or ready to use (RTU) compositions. According to an embodiment of the invention a use dilution of the concentrate composition can range from about 1:1 to about 1:50. Dilution ranges in between are also suitable according to the present invention. More preferably, a use dilution of about 1:1 to about 1:40, about 1:1 to about 1:30, about 1:1 to about 1:20, about 1:1 to about 1:10, about 1:2 to about 1:10, or about 1:3 to about 1:6 is obtained from the concentrate composition. Beneficially, the cleaning compositions are capable of decreasing required cleaning time in comparison to a conventional caustic-based fryer cleaning composition, including reduced cleaning to less than about 30 minutes, less than about 25 minutes, less than about 20 minutes, less than about 15 minutes, or less than about 10 minutes for total cleaning time. The cleaning compositions beneficially achieves the reduced cleaning time due to ability of the composition to cling or adhere to surfaces, including vertical surfaces, and emulsify and/or disperse any residual fat/oil in the fryer. This provides effective draining and rinsing, along with preventing the redeposition of fat/oils and other particles in the fryer. As a further benefit, in some aspects where low concentrations (or elimination of caustic and other highly alkaline alkalinity sources) of caustic are employed the cleaning compositions do not require use of PPE for personal safety considerations. PPE may include, for example, goggles, eye wash stations, masks and other protective equipment.

Embodiments include a composition that is substantially free of phosphates, phosphorous, or phosphonates, volatile organic compounds, and/or caustic alkalinity sources. In other embodiments, the cleaning compositions have a relatively high flash point (as defined by a composition or to a component of a composition having a flash point of greater than about 100° C.), low vapor pressure (as defined by a solvent having a vapor pressure less than 0.1 mmHg when measured at 20° C.) and a concentrate and/or use pH of below about 11.5, between about 8.75-11.5, or between about 8-11.5.

Alkalinity Sources

The cleaning compositions include at least one alkalinity source to provide desired alkaline cleaning conditions to remove the greasy soils from the surfaces in need of treatment. In an aspect, the alkalinity source(s) provides a use solution with a pH below about 11.5. In an aspect, the alkalinity source(s) provides a use solution with a pH less than about 11, less than about 10.5 or less than about 10. In a further aspect, the alkalinity source(s) provides a use solution with a pH between about 10-11.5.

Suitable alkalinity sources include, but are not limited to, one or more organic alkalinity sources, one or more inorganic alkalinity sources, or combinations thereof. Suitable organic alkalinity sources include, but are not limited to, amines and strong nitrogen bases including, for example monoethanolamine, monopropanolamine, diethanolamine, dipropanolamine, triethanolamine, tripropanolamine, mixed isopropanolamines, and the like, or combinations thereof. In preferred embodiments, the cleaning compositions do not include triethanolamines, including for example triethanolamine gluconate in combination with the solvent, namely the benzyl alcohol.

Suitable inorganic alkalinity sources include, but are not limited to, alkali metal hydroxides, alkali metal carbonates (e.g., sodium carbonate, potassium carbonate, sodium bicarbonate, potassium bicarbonate, sodium sesquicarbonate, potassium sesquicarbonate, and the like, or combinations thereof), alkali metal borates (e.g., sodium borate, potassium borate, and the like, or combinations thereof), alkali metal oxides (e.g., sodium oxide, potassium oxide, and the like, or combinations thereof), and the like, or combinations thereof. Examples of one or more alkalinity sources include one or more of an alkanolamine and/or alkali metal carbonate.

A number of commercially available alkalinity sources may be suitable for use in the cleaning compositions. Commercially available alkalinity sources may include amino alcohols include, but are not limited to, primary amino alcohols (e.g. 2-Amino-2-methyl-1-propanol), amino alcohols (e.g. 2-Amino-2-methyl-1-propanol), commercially available alkyl alkanolamines including, but not limited to, monoethanolamine.

In a preferred aspect, the alkalinity sources can include ethanolamines and/or carbonates. In a further preferred aspect, the alkalinity sources include monoethanolamine, diethanolamine, triethanolamine, 2-amino-2-methyl-1-propanol, monoisopropanolamine, diisopropanolamine, 2-(2-Aminoethoxyl)ethanol (DGA) and/or an alkali metal carbonate. In a further preferred aspect, the alkalinity sources do not include caustic, including for example, any alkali metal hydroxides. In still other preferred aspects, the alkalinity sources do not include monoethanolamine, caustic and/or other highly alkaline components that result in an index value that require classification as a hazardous material, thereby requiring use of PPE when handling the cleaning composition. In such preferred aspects, the caustic and/or other highly alkaline components are included at less than about 1 wt-% per component in a concentrate cleaning composition. In other aspects, such alkalinity sources are excluded from the cleaning composition. Beneficially, the compositions are PPE-free formulations.

In a preferred aspect the compositions include a single alkalinity source providing a less alkaline composition, and preferably a non-caustic alkaline cleaning composition. This is distinct from various highly alkaline cleaning ocmpositions including both a hydroxime and/or ethanol amine alkalinity source, and often requiring the use of PPE. The use of a signle alkalinity source, preferably an alkanolamine such as monoethanolamine, does not cause stability or phase separation of the cleaning composition.

In an aspect, the compositions include from about 1 wt-% to about 50 wt-% alkalinity source, from about 1 wt-% to about 25 wt-% alkalinity source, from about 4 wt-% to about 25 wt-% alkalinity source, from about 4 wt-% to about 20 wt-% alkalinity source, from about 4 wt-% to about 10 wt-% alkalinity source, from about 5 wt-% to about 20 wt-% alkalinity source, or from about 5 wt-% to about 10 wt-% alkalinity source. In addition, without being limited according to the invention, all ranges recited are inclusive of the numbers defining the range and include each integer within the defined range.

Rheology Modifiers

The cleaning compositions include at least one rheology modifier to provide desired thickening, enhanced viscoelasticity, anti-misting and cling of the cleaning composition on the surfaces in need of treatment. Rheology modifiers are often also often conventionally referred to as 'thickeners', when they refer to components added to the cleaning composition to maintain a thickened, enhanced viscoelastic single-phase cleaning composition in a liquid form. Beneficially, the rheology modifiers can further allow the liquid composition to remain in a single phase even when agitated, such as dispensing through an aspirator.

Rheology modifiers as referred to herein as suitable for use in the cleaning compositions must provide a desired thickening of a solvent-based alkaline cleaning composition, as opposed to conventional rheology modifiers which can act in a divergent manner to reduce the thickening of a solvent-based system. As one skilled in the art will ascertain from the methods and compositions disclosed herein, the formulations must be phase stable and the formulation components (actives) able to get and remain in solution. Phase stability can depend upon formulations and methods of making, which include considerations of pH, dispersion and time, for example. Examples of rheology modifiers which are unable to provide the desired thickening or viscoelasticity for the phase stable cleaning compositions include, for example, various polyacrylate polymers, including for example polymers/homopolymers of acrylic acid, hydrophobically modified alkali soluble acrylic polymer emulsions (HASE), alkali soluble acrylic polymer emulsions, such as Acusol 445N, Acusol 820, Acusol 830, Ecolab Gel-Additive (proprietary mixture/product), Antil Liquid 141 (Polyethoxypropylene Glycoldioleate), Crystasense HP5-PA (MV) (Polyamide Resin), Crystasense Sapphire-LQ-(RB) (hydrophobically modified alkali soluble emulsions (HASE),), Crodasinic LS-30 LC-LQ-(RB) (Sodium N-Lauroylsarcosinate), CustoPoly GL (Acrylic based polymer), and Nalco 625 Polymer. In preferred embodiments, the aforementioned rheology modifiers are excluded from the fryer cleaning compositions.

Rheology modifiers suitable for the cleaning compositions can include polysaccharide materials, including for example cellulose materials. In an aspect, a preferred cellulose rheology modifier is hydroxyethyl cellulose, commercially available as Natrosol 250 HBR. In another aspect, a preferred rheology modifier is a polymeric surfactant, such as those commercially available as Croda's Sapphire (Acrylic Polymer) and Crodasinic LS-30 (Sodium Lauroyl Sarcosinate) and/or Crodasinic CS-30 (anionic surfactant consisting of sodium cocoyl sarcosinate). In a still further aspect, rheology modifiers can include polymers, xanthum gums, clay particles, etc. which provide the desired thickening and viscoelasticity. In an aspect, the compositions include from about 0.1 wt-% to about 5 wt-% rheology modifier(s), from about 0.1 wt-% to about 3 wt-% rheology modifier(s), from about 0.3 wt-% to about 3 wt-% rheology modifier(s), from about 0.5 wt-% to about 3 wt-% rheology modifier(s), or from about 1 wt-% to about 3 wt-% rheology modifier(s). In addition, without being limited according to the invention, all ranges recited are inclusive of the numbers defining the range and include each integer within the defined range.

Solvents

The cleaning compositions include at least one solvent for penetration and breakdown of polymerized fats on surfaces. Exemplary solvents and solvent systems include limited water soluble alcohols. In an aspect, a benzyl alcohol solvent and/or solvent system is employed. Without being limited to a particular mechanism of action, in some embodiments, the solvent provides a limited water soluble alcohol providing hydrophobicity that adds affinity towards greasy soils and acts as a plasticizer.

Additional suitable solvents and solvent systems may include one or more different solvents including aromatic alcohols, alkanol amines, ether amines, amidines, esters and mixtures thereof. Representative solvents may include 1,8-Diazabicyclo[5.4.0]undec-7-ene, or also may be referred to as 2,3,4,6,7,8,9,10-Octahydropyrimidol[1,2-a]azepine (or DBU), 2.5.7.10-tetraoxaundecante (TOU), acetamidophenol, acetanilide, acetophenone, 2-acetyl-1-methylpyrrole, glycerine, benzyl acetate, benzyl alcohol, methyl benzyl alcohol, alpha phenyl ethanol, benzyl benzoate, benzyloxyethanol, ethylene glycol phenyl ether, propylene glycol phenyl ether, amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether, tripropylene glycol n-butyl ether, diethylene glycol n-butyl ether acetate, diethylene glycol monobutyl ether, ethylene glycol n-butyl ether acetate, ethylene glycol monobutyl ether, dipropylene glycol monobutyl ether, propylene glycol monobutyl ether, ethyl 3-ethoxypropionate, 2,2,4-Trimethyl-1,3-Pentanediol Monoisobutyrate, diethylene glycol monohexyl ether, ethylene glycol monohexyl ether, diethylene glycol monomethyl ether, diethylene glycol monoethyl ether, ethylene glycol methyl ether acetate, ethylene glycol monomethyl ether, dipropylene glycol monomethyl ether, propylene glycol methyl ether acetate, propylene glycol monomethyl ether, diethylene glycol monopropyl ether, ethylene glycol monopropyl ether, dipropylene glycol monopropyl ether and propylene glycol monopropyl ether. Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate. An additional solvent may include Butylal (Formaldehyde Dibutyl Acetal).

Preferred solvents for wetting of polymerized soils include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof.

In an aspect, the compositions include from about 1 wt-% to about 60 wt-% solvent, from about 1 wt-% to about 50 wt-% solvent, from about 3 wt-% to about 40 wt-% solvent, from about 5 wt-% to about 40 wt-% solvent, or from about 5 wt-% to about 30 wt-% solvent. In addition, without being limited according to the invention, all ranges recited are inclusive of the numbers defining the range and include each integer within the defined range.

Water and/or Other Carrier

The cleaning compositions provided as liquid formulations, including concentrations and/or ready-to-use solutions include water and/or a carrier. In some aspects, the cleaning compositions do not include added water. In an aspect, the compositions include from about 5 wt-% to about 90 wt-% water and/or other carrier, from about 10 wt-% to about 90 wt-% water and/or other carrier, from about 10 wt-% to about 85 wt-% water and/or other carrier, from about 5 wt-% to about 80 wt-% water and/or other carrier, from about 10 wt-% to about 80 wt-% water and/or other carrier, from about 15 wt-% to about 90 wt-% water and/or other carrier, from about 20 wt-% to about 85 wt-% water and/or other carrier, from about 15 wt-% to about 80 wt-% water and/or other carrier, from about 5 wt-% to about 40 wt-% solvent, or from about 5 wt-% to about 30 wt-% solvent. In addition, without being limited according to the invention, all ranges recited are inclusive of the numbers defining the range and include each integer within the defined range.

Surfactants/Emulsifiers/Wetting Agents

The cleaning compositions include at least one surfactant, emulsifier and/or wetting agent to provide desired break down and thereafter emulsification and dispersion of soils, namely oils and grease, that are found in the fryer (or other hard surface in need of treatment). These active agents are referred to herein as "emulsifiers."

Emulsifying surfactants or mixtures of surfactants can have foaming or defoaming characteristics in the composition as required by a desired cleaning method. For example, in certain applications long lasting foam may be required which can extend the cleaning time on a surface for the compositions. In certain applications it may be desirable to minimize foaming and a surfactant or surfactant system that provides reduced foaming can be used. In addition, it may be desirable to select a surfactant or surfactant system that exhibits foam that breaks down relatively quickly so that the composition can be recovered and reused with an acceptable amount of down time. Without being limited to a particular mechanism of action, in some embodiments low foaming surfactants are preferred to minimize the amount of soils that remain or are trapped in foam and therefore less effectively removed from the surfaces to be cleaned.

The surfactant or surfactant system can be selected depending upon the particular polymerized soil that is to be removed. In an aspect, the surfactant or surfactant system provides a low to mid-foaming application. Useful surfactants include anionic, nonionic, cationic, and zwitterionic surfactants, which are commercially available from a number of sources. For a discussion of surfactants, see Kirk-Othmer, Encyclopedia of Chemical Technology, Third Edition, volume 8, pages 900-912. Additional description of suitable surfactants is set forth in U.S. patent application Ser. No. 12/816,016 (filed Jun. 15, 2010), both references which are incorporated herein by reference in their entirety. The surfactants described herein can be used alone or in combination. In particular, the nonionics and anionics can be used in combination. The semi-polar nonionic, cationic, amphoteric and zwitterionic surfactants can be employed in combination with nonionics or anionics. The above examples are merely specific illustrations of the numerous surfactants which can find application within the scope of this invention. It should be understood that the selection of particular surfactants or combinations of surfactants can be based on a number of factors including compatibility with the surface to be cleaned at the intended use concentration and the intended environmental conditions including temperature and pH.

In addition, the level and degree of foaming under the conditions of use and in subsequent recovery of the composition can be a factor for selecting particular surfactants and mixtures of surfactants. According to an embodiment of the invention, the foaming properties and viscosity of surfactants are suitable for uses having applications to vertical surfaces.

In an aspect, the emulsifier is a nonionic surfactant, such as Lutensol TO 8 commercially available from BASF, anionic disulfate surfactant, such as Dowfax 2A1 (alkyldiphenyloxide disulfonate) and/or an anionic sulfosuccinate surfactants, such as Multiwet MO-70E-LQ-(AP) (dioctyl sodium sulfosuccinate in ethanol) or Aerosol 22 (sodium alkyl sulfosuccinate). In another aspect, the emulsifier is an anionic surfactant such as Dodecyl Benz Sulfonic Acid.

In an aspect, the compositions include from about 1 wt-% to about 25 wt-% surfactants, emulsifiers, and/or wetting agents, from about 1 wt-% to about 25 wt-% alkalinity source, from about 2 wt-% to about 20 wt-% surfactants, emulsifiers, and/or wetting agents, from about 4 wt-% to about 20 wt-% surfactants, emulsifiers, and/or wetting agents, or from about 5 wt-% to about 20 wt-% surfactants, emulsifiers, and/or wetting agents. In addition, without being limited according to the invention, all ranges recited are inclusive of the numbers defining the range and include each integer within the defined range.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of Nonionic Low Foaming Surfactants Include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

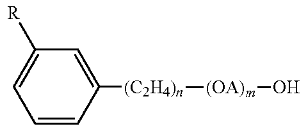

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n\ (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n\ (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n\ (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_xH$, where x is in the range of from 1 to 3.

A useful class of non-ionic surfactants include the class defined as alkoxylated amines or, most particularly, alcohol alkoxylated/aminated/alkoxylated surfactants. These nonionic surfactants may be at least in part represented by the general formulae: $R^{20}—(PO)_SN\text{-}(EO)_tH$, $R^{20}—(PO)_SN\text{-}(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)_V—N[(EO)_wH]\ [(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

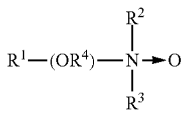

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

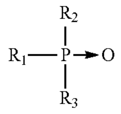

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

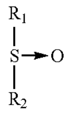

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); and capped alcohol alkoxylates, such as Plurafac LF221 and Tegoten EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

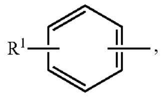, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

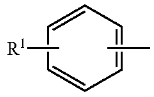

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y- and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

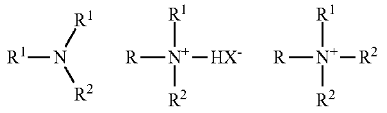

in which, R represents an alkyl chain, R', R", and R"' may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

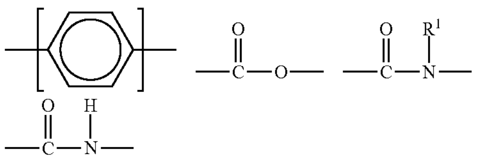

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

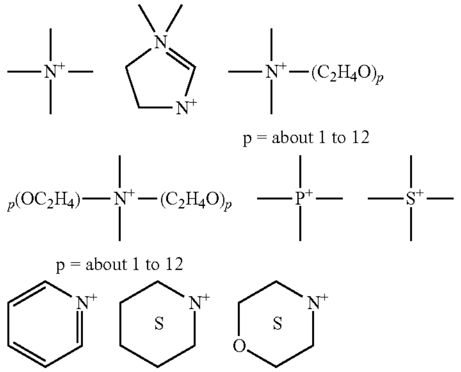

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

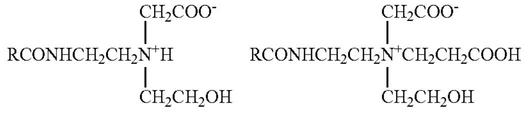

(MONO)ACETATE (DI)PROPIONATE

Neutral pH Zwitternion

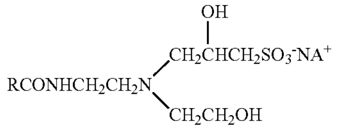

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8\text{-}C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$ ($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

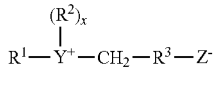

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3—(N,N-dimethyl-N-hexadecylammonio)-propane-1-sulfonate; 3—(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

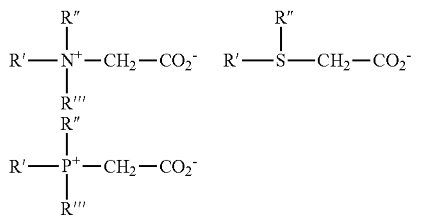

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Additional Functional Ingredients

The components of the cleaning composition can further be combined with various functional components suitable for use in the hard surface cleaning applications, namely fryer cleaning. In some embodiments, the cleaning composition including the rheology modifier for thickened viscoelastic and anti-misting cleaning compositions have desired ability to cling to surfaces in need of treatment, surfactants/emulsifiers/wetting agents, alkalinity source, and solvents make up a large amount, or even substantially all of the total weight of the cleaning composition. For example, in some embodiments few or no additional functional ingredients are disposed therein.

In some embodiments, the cleaning compositions do not require the use of additional solubilizing agents. Exemplary solubilizing agents not included in the cleaning compositions, include for example, nitrogen containing heterocycles/heteroaryls include but are not limited to, pyrrole, imidazole, pyrazole, pyridine, pyrazine, pyrimidine, pyridazine, indolizine, isoindole, indole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, phenoxazine, phenothiazine, imidazolidine, imidazoline, piperidine, piperazine, indoline, morpholino, piperidinyl, tetrahydrofuranyl, and the like as well as N-alkoxy-nitrogen containing heterocycles.

In additional embodiments, the cleaning compositions do not include bleaching agents.

In other embodiments, additional functional ingredients may be included in the cleaning compositions. The functional ingredients provide desired properties and functionalities to the compositions. For the purpose of this application, the term “functional ingredient” includes a material that when dispersed or dissolved in a use and/or concentrate solution, such as an aqueous solution, provides a beneficial property in the particular use of fryer and other hard surface cleaning. Some particular examples of functional materials are discussed in more detail below, although the particular materials discussed are given by way of example only, and that a broad variety of other functional ingredients may be used.

In preferred embodiments, the compositions do not include caustic and/or highly alkaline alkalinity sources requiring the use of PPE in formulated cleaning compositions. In preferred embodiments, the compositions do not include hydroxides and/or carbonates and/or other alkaline earth bases as alkalinity sources.In other embodiments, the compositions may include defoaming agents, anti-redeposition agents, bleaching agents, solubility modifiers, dispersants, rinse aids, metal protecting agents, stabilizing agents, corrosion inhibitors, additional sequestrants and/or chelating agents (such as sodium gluconate), fragrances and/or dyes, additional rheology modifiers, additional hydrotropes or couplers (such as sodium xylene sulfonate (SXS)), buffers, solvents and the like In an aspect, the compositions include from about 0 wt-% to about 30 wt-% additional functional ingredients, from about 0 wt-% to about 25 wt-% additional functional ingredients, from about 0.1 wt-% to about 25 wt-% additional functional ingredients, or from about 0.1 wt-% to about 20 wt-% additional functional ingredients. In addition, without being limited according to the invention, all ranges recited are inclusive of the numbers defining the range and include each integer within the defined range.

Methods of Use

The cleaning compositions are suitable for use in treating hard surfaces soiled with greasy soils. In a preferred aspect, the hard surface is a fryer.

In an aspect, use of the cleaning compositions to clean fryers requires the fryer to be turned off and cooled, along with draining off any oil contained therein before contacting the cleaning composition to the surfaces in need of cleaning. In a beneficial aspect, the cleaning methods do not require the use of a convention “boil out” process which can take as long as 45 minutes, 60 minutes or longer, where the cleaning composition is added to water filled within the fryer that is then boiled (or raised to a temperature between about 180° F.-210° F.) before cooling, scrubbing, draining, rinsing and further drying and/or cleaning. Instead, the methods add the cleaning composition in either a ready to use liquid (or concentrate liquid), at room temperature. In an aspect, a temperature range from about 50° F.-90° F., about 50° F.-80° F., or about 50° F.-70° F. is used for the addition of the cleaning composition to the fryer in need of cleaning.

The cleaning composition can be applied at various concentrations and rates of application, through use of the concentrate or ready-to-use (diluted) liquid compositions. In an aspect, an application rate between about 1 oz to about 10 oz is preferred, or from about 1 oz to about 5 oz, or about 4 oz to about 5 oz for a typical fryer cleaning application. In an aspect, the cleaning composition can be in contact with the fryer (or other hard surface in need of cleaning) to penetrate the soils for a few seconds to a few minutes. In some aspects, the contact time is less than 1 minute. In other aspects, the contact time is for at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 11 minutes, at least about 12 minutes, at least about 13 minutes, at least about 14 minutes, or at least about 15 minutes. As one skilled in the art will appreciate, a decreased cleaning time and time required for penetration of soils on the treated surface is desired. However, in certain embodiments a longer contact and penetration time, such as greater than 15 minutes, may be employed in order to utilize less concentrated cleaning compositions, for example, and such are included within the scope of the claimed methods and cleaning compositions. Once the cleaning composition has been in contact with the fryer (or other hard surface in need of cleaning) for a sufficient amount of time, the cleaning composition can be drained from the fryer and a brush, non-scratch pad or other device can be used to scrub any soiled surfaces. Thereafter, the surface can be rinsed with cold, room temperature or hot water. The fryer (or other hard surface in need of cleaning) can then be dried using any conventional means, including for example, use of clean paper towels or allowing to air dry before any oil is added back in into the fryer.

Beneficially, the methods of cleaning significantly decrease overall cleaning time in comparison to a conventional caustic-based fryer cleaning composition requiring the conventional “boil out” process. In an aspect, cleaning time is reduced to less than about 30 minutes, less than about 25 minutes, or less than about 20 minutes.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims. A listing of Chemicals and their reference names used in Examples is provided here:

- 2-(2-aminoethoxy)ethanol (DGA)
- 2,5,7,10-Tetraoxaundecane (TOU)
- Benzyl Alcohol
- 1,8-Diazabicyclo[ 5.4.0]undec-7-ene (DBU)
- LAS (Dodecyl Benz Sulfonic Acid 96%/sodium dodecylbenzenesulfonate, 96%)
- Dowfax 2A1 (Sodium Dodecyl Diphenyl Oxide Disulfide, 45%)
- Ethylene Glycol Phenyl Ether (EPh)
- Butylal (Formaldehyde Dibutyl Acetal)
- Glycerine, 96%
- Lauryl Dimethyl Amine Oxide 30%
- Lauryl Dimethylamine Oxide (Barlox 12, LMDO)
- Lutensol TO 8 nonionic surfactant (saturated iso-C13 alcohol)
- Monoethanolamine 99%
- Multiwet MO-70E-LQ-(AP) (Dioctyl sodium sulfosuccinate in ethanol)
- Natrosol 250 H4BR (Hydroxyethyl cellulose)
- ACUSOL 820 (Hydrophobically modified Alkali Soluble acrylic polymer
- Emulsion (HASE))
- Plurafac SL 62 (C6-10 Alcohols, ethoxylated and/or propoxylated)
- Potassium Carbonate 47% liquid
- Propylene Glycol
- Aerosol 22 surfactant (Sodium Alkyl Sulfosuccinate 35%)
- Sodium dodecylbenzenesulfonate, 96% (LAS)
- Sodium Gluconate chelant
- Sodium Xylene Sulfonate, 40%
- Triethanolamine-99% (2', 2"-nitrilotriethanol)
- Commercial Control A (use solution): benzyl alcohol (5-10%), monoethanolamine (1-5%), benzenesulfonic acid, dodecyl compound with 2-aminoethanol (1:1) (1-5%) Commercial Control B (use solution): sodium hydroxide

Example 1

Various emulsifiers and rheology modifiers were evaluated through screening tests to determine ability to increase a composition's cling time after the composition is applied to a vertical surface and the time the composition was visible on the surface was recorded. The control formulation listed in Table 3 was used as the starting point and comparison for modified formulations. Different rheology modifiers were added into the control formulation, either alone or in combinations, respectively, and their effects on the compositions' cling times were then observed and evaluated. Based on the initial evaluation a polysaccharide material, hydroxyethyl cellulose, was selected for further evaluation.

The Control was compared to an evaluated formula containing the hydroxyethyl cellulose as a rheology modifier to thicken the composition and beneficially increase cling time for the composition to contact a soiled surface. Formula 26 (a RTU composition shown in Table 4H without further dilution was applied to a stainless steel coupon for comparison to the Control). The formulas were applied side-by-side to a polymerized oil coated stainless steel panel and allowed to remain in contact for a 2 minutes 22 second time period. The evaluated Formula 26 (Table 4H) show ability to remain on the vertical surface and remove the film layer of the panel. The polymerized oil coating the surface could be visually detected as dripping down into the container at the bottom of the panel, whereas the Control formula shows no attack of the film and/or removal of the layer as depicted by an empty container at the bottom of the panel.

Example 2

Various agents for improving emulsification were also evaluated. A simple setup for evaluating an emulsification agent was set up by using individual glass vials with lids to house both an evaluated chemistry and oils for emulsification. Control, and Formulas 1-4 were evaluated by placing 2% experimental composition inside a vial before vegetable oil (soybean) was added slowly on the top of the oil followed by two drops of a 1% solution of water and a soluble blue dye. After the liquids were mixed well the height of the aqueous layer was recorded at a series of time points. The heights of the aqueous layer 23 seconds and approximately 7 minutes (6 minutes 58 seconds) after shaking the vials were observed. The water soluble blue dye was used in the experiment to enhance the visual effect.

Visual observation of the differences in the heights of the aqueous bottom layer of each sample were made. In addition, the height of the emulsification layer was recorded at a series of time points and the rate of the height changes (mm/min) was calculated by dividing the height of the aqueous layer by the time. The experimental compositions in the first and fifth vial (corresponding to formulas of Table 2) showed a phase separation with a greater height of the aqueous layer, indicating less emulsification of the fryer grease. On the other hand, the experimental compositions in the second, third, and fourth vials (corresponding to formulas of Table 2) showed a relatively less aqueous layer, indicating more emulsification for the compositions in those vials. The compositions able to minimize grease/composition phase separation (keep more grease in the composition) for a longer time are indicative of a higher performing fryer cleaning composition. The slower the rate of the height change is, the better the emulsification of a composition is.

Additional evaluations of vials containing five different experimental compositions, respectively, at three time points using the same emulsification evaluation were evaluated. The key ingredient for each experimental composition, the height of aqueous layer at two different time points, and relative ranking are listed in Table 2. The base composition (Sample 1 in Table 2) in this evaluation was again the control composition listed in the following Table 3. The vials did not include the use of a dye for the subsequent evaluation. The heights of the aqueous layer in each vial at 30 seconds after mixing and 10 minutes after mixing were measured, indicating the degree of phase separation. Table 2 shows a summary of emulsification results for several tested compositions.

TABLE 2

Summary of Emulsification Results for Selected Compositions.

| Sample ID | Composition | Height ca. 5 min. | Height ca. 10 min. | Rank |
|---|---|---|---|---|
| 1 | Control (shown in Table 3) | 6 mm | 12 mm | #5 |
| 2 | Formula. 26 (shown in Table 4H) | Not Recorded | 9 mm | #4 |
| 3 | Control + 2 wt-% of Multiwet M0-70E-LQ-(AP) | 1 mm | 3 mm | #1 |
| 4 | Control + 2 wt-% of Sodium Alkyl Sulfosuccinate 35% (aerosol 22 surfactant) | 1 mm | 3 mm | #1 |
| 5 | Control + 2 wt-% of Lutensol TO 8 (Emulsifier/Dispersant/Wetting) | 1 mm | 3 mm | #1 |

The results in Table 2 indicate that the control formulation does not emulsify fryer grease very well. Adding hydroxyethyl cellulose to the control formulation as in Sample 2 (Formulation 26) does not improve emulsification of the control formulation, although hydroxyethyl cellulose does improve cling time of a composition as shown earlier. On the other hand, adding Multiwet MO-70E-LQ-(AP), Sodium Alkyl Sulfosuccinate, or Lutensol TO 8, respectively, improves emulsification.

Example 3

Various fryer cleaning compositions were made and evaluated for cling time, emulsification effects, and cleaning time. Table 3 lists the ingredients of the Control composition. Tables 4A-4J lists the ingredients of the various evaluated fryer cleaning compositions. Table 5 summarizes the evaluation results and comparison of the various evaluated fryer cleaning compositions.

TABLE 3

Control Formulation

| Quantity, Wgt. % | Description |
|---|---|
| 82.7 | Water |
| 3-6 | Alkalinity sources including Monoethanolamine 99% IBC |
| 1-3 | Wetting agent/surfactant |
| 8-10 | Benzyl alcohol solvent |

TABLE 4A

Exemplary Formulations for Evaluating Cling Time, Emulsification, Cleaning Time

| | Formula 1 | | Formula 2 | | Formula 3 | | Formula 4 | |
|---|---|---|---|---|---|---|---|---|
| Description | Wgt., g | Wgt., % | Wgt., g | Wgt., % | Wgt., g | Wgt., % | Wgt., g | Wgt., % |
| Water Zeolite Softened TNK | 78.46 | 78.43 | 78.46 | 78.46 | 83.95 | 83.91 | 84.27 | 84.23 |
| Natrosol 250 HR | 0.94 | 0.94 | 0.52 | 0.52 | 0.53 | 0.53 | 0.75 | 0.75 |
| Monoethanolamine | 4.51 | 4.51 | 4.56 | 4.56 | 3.54 | 3.54 | 4.03 | 4.03 |
| Dodecylbenzene Sulfonic Acid 96% IBC (LAS) | 2.80 | 2.80 | 2.84 | 2.84 | 2.66 | 2.66 | 2.25 | 2.25 |
| Sodium Dioctyl Sulfosuccinate, 70% | 1.36 | 1.36 | 1.39 | 1.39 | 1.26 | 1.26 | 0.97 | 0.97 |
| Plurafac SL 62 (Emul./Dispersant) | 2.04 | 2.04 | 2.09 | 2.09 | 2.08 | 2.08 | 0.96 | 0.96 |
| 2-(2-Aminoethoxy)ethanol | 0.94 | 0.94 | 0.94 | 0.94 | 0.00 | 0.00 | 0.00 | 0.00 |
| Benzyl Alcohol | 8.99 | 8.99 | 9.20 | 9.20 | 6.02 | 6.02 | 6.84 | 6.84 |

TABLE 4B

| | Formula 5 | | Formula 6 | | Formula 7 | | Formula 8 | |
|---|---|---|---|---|---|---|---|---|
| Description | Wgt., g | Wgt., % | Wgt., g | Wgt., % | Wgt., g | Wgt., % | Wgt., g | Wgt., % |
| Water Zeolite Softened TNK | 82.02 | 81.91 | 84.27 | 84.23 | 82.21 | 82.90 | 79.95 | 79.63 |
| Natrosol 250 HR | 0.75 | 0.75 | 0.77 | 0.77 | 0.74 | 0.75 | 1.02 | 1.02 |
| Monoethanolamine | | | | | 0.90 | 0.91 | 4.64 | 4.62 |
| Diisopropanolamine, 90% | 6.04 | 6.03 | | | 4.04 | 4.07 | | |
| Triethanolamine | | | 4.63 | 4.63 | | | | |
| Dodecylbenzene Sulfonic Acid 96% IBC (LAS) | 2.48 | 2.48 | 2.92 | 2.92 | 2.26 | 2.28 | 2.72 | 2.71 |
| Sodium Dioctyl Sulfosuccinate, 70% | 1.00 | 1.00 | 1.04 | 1.04 | 0.96 | 0.97 | 1.06 | 1.06 |
| Plurafac SL 62 (Emul./Dispersant) | 1.04 | 1.04 | 1.04 | 1.04 | 0.96 | 0.97 | 1.02 | 1.02 |
| 2-(2-Aminoethoxy)ethanol | | | | | | | 0.96 | 0.96 |
| Benzyl Alcohol | 6.80 | 6.79 | 5.37 | 5.37 | 7.09 | 7.15 | 9.03 | 8.99 |

TABLE 4C

| Description | Formula 9 Wgt., g | Formula 9 Wgt., % | Formula 10 Wgt., g | Formula 10 Wgt., % | Formula 11 Wgt., g | Formula 11 Wgt., % | Formula 12 Wgt., g | Formula 12 Wgt., % |
|---|---|---|---|---|---|---|---|---|
| Water Zeolite Softened TNK | 83.86 | 83.75 | 80.54 | 80.52 | 75.10 | 75.62 | 75.20 | 80.72 |
| Natrosol 250 H4BR | | | | | 0.80 | 0.81 | 0.81 | 0.87 |
| Benecol E10M | 0.75 | 0.75 | 0.73 | 0.73 | | | | |
| Monoethanolamine | 0.90 | 0.90 | 0.94 | 0.94 | 0.95 | 0.96 | 0.95 | 1.02 |
| Diisopropanolamine, 90% | 2.34 | 2.34 | 2.84 | 2.84 | 2.33 | 2.35 | 2.72 | 2.92 |
| Triethanolamine | 2.52 | 2.52 | 2.65 | 2.65 | 2.55 | 2.57 | 2.50 | 2.68 |
| Ammonyx LMDO, 33% (Stepan) | | | | | 2.09 | 2.10 | 0.00 | 0.00 |
| Glucopon 425N, 50% | | | | | | | 0.00 | 0.00 |
| Sodium Dioctyl Sulfosuccinate, 70% | 2.21 | 2.21 | 2.46 | 2.46 | 2.52 | 2.54 | | 0.00 |
| Disodium Cocoamphodiacetate, 38% (CADA) | | | | | 2.22 | 2.24 | | 0.00 |
| Plurafac SL 62 | 2.46 | 2.46 | | | | | | |
| Ammonium Lauryl Sulfate, 27% | | | 4.33 | 4.33 | 5.63 | 5.67 | 5.66 | 6.08 |
| Benzyl Alcohol | 5.09 | 5.08 | 5.54 | 5.54 | 5.12 | 5.16 | 5.32 | 5.71 |

TABLE 4D

| Description | Formula 13 Wgt., g | Formula 13 Wgt., % | Formula 14 Wgt., g | Formula 14 Wgt., % | Formula 15 Wgt., g | Formula 15 Wgt., % | Formula 16 Wgt., g | Formula 16 Wgt., % |
|---|---|---|---|---|---|---|---|---|
| Water Zeolite Softened TNK | 78.13 | 78.11 | 82.48 | 82.33 | 82.28 | 82.18 | 84.28 | 84.26 |
| Acusol 820 | 3.02 | 3.02 | 2.97 | 2.96 | 2.97 | 2.97 | 3.05 | 3.05 |
| Monoethanolamine | 0.96 | 0.96 | 0.94 | 0.94 | 0.93 | 0.93 | | |
| Diisopropanolamine, 90% | 2.76 | 2.76 | 2.73 | 2.73 | 2.73 | 2.73 | 2.14 | 2.14 |
| Triethanolamine | 2.56 | 2.56 | 2.46 | 2.46 | 2.64 | 2.64 | 3.14 | 3.14 |
| Sodium Dioctyl Sulfosuccinate, 70% | 2.24 | 2.24 | 2.30 | 2.30 | 3.12 | 3.12 | 1.31 | 1.31 |
| Dodecylbenzene Sulfonic Acid 96% | | | 0.92 | 0.92 | | | 0.93 | 0.93 |
| Ammonium Lauryl Sulfate, 27% | 5.13 | 5.13 | | | | | | |
| Benzyl Alcohol | 5.22 | 4.50 | 5.38 | 5.37 | 5.45 | 5.44 | 5.17 | 5.17 |

TABLE 4E

Added Acusol to 18-20 formulas, for better sprayability

| Description | Formula 17 Wgt., g | Formula 17 Wgt., % | Formula 18 Wgt., g | Formula 18 Wgt., % | Formula 19 Wgt., g | Formula 19 Wgt., % | Formula 20 Wgt., g | Formula 20 Wgt., % |
|---|---|---|---|---|---|---|---|---|
| Water Zeolite Softened TNK | 84.10 | 84.08 | 81.75 | 81.68 | 79.66 | 79.51 | 79.72 | 79.66 |
| Natrosol 250 H4BR | 0.56 | 0.56 | | | | | 0.35 | 0.35 |
| Acusol 820 | | | 3.06 | 3.06 | 3.03 | 3.02 | 2.88 | 2.88 |
| Monoethanolamine | 0.92 | 0.92 | 0.96 | 0.96 | 4.58 | 4.57 | 4.74 | 4.74 |
| Diisopropanolamine, 90% | 1.63 | 1.63 | 1.60 | 1.60 | | | | |
| Triethanolamine | 2.93 | 2.93 | 2.95 | 2.95 | | | | |
| Plurafac SL 62 | 1.93 | 1.93 | 1.94 | 1.94 | | | | |
| 2-(2-Aminoethoxy)ethanol DRM | | | | | 0.91 | 0.91 | 0.97 | 0.97 |
| Dodecylbenzene Sulfonic Acid 96% | 2.60 | 2.60 | 2.49 | 2.49 | 2.88 | 2.87 | 2.62 | 2.62 |
| Benzyl Alcohol | 5.35 | 5.35 | 5.34 | 5.34 | 9.13 | 9.11 | 8.80 | 8.79 |

TABLE 4F

| Description | Formula 21 Wgt., g | Formula 21 Wgt., % | Formula 22 Wgt., g | Formula 22 Wgt., % | Formula 23 Wgt., g | Formula 23 Wgt., % | Formula 24 Wgt., g | Formula 24 Wgt., % |
|---|---|---|---|---|---|---|---|---|
| Water Zeolite Softened TNK | 87.15 | 82.78 | 83.73 | 82.14 | 80.52 | 80.68 | 82.11 | 82.87 |
| Natrosol 250 HR | | | | | | | 0.85 | 0.86 |
| Acusol 820 | 3.03 | 2.88 | 3.07 | 3.01 | 3.02 | 3.03 | | |
| Monoethanolamine | | | | | 0.91 | 0.91 | 0.89 | 0.90 |
| Diisopropanolamine, 90% | 2.25 | 2.14 | 2.23 | 2.19 | 2.58 | 2.59 | 2.24 | 2.26 |
| Triethanolamine | 2.67 | 2.54 | 2.60 | 2.55 | 2.60 | 2.61 | 2.27 | 2.29 |
| Dodecylbenzene Sulfonic Acid 96% IBC (LAS) | 1.01 | 0.96 | 0.94 | 0.92 | 1.22 | 1.22 | 0.97 | 0.98 |
| Sodium Dioctyl Sulfosuccinate, 70% | 1.29 | 1.23 | 1.45 | 1.42 | 1.27 | 1.27 | 1.34 | 1.35 |
| Plurafac SL 62 (Emul./Dispersant) | 2.13 | 2.02 | 2.02 | 1.98 | 2.06 | 2.06 | 2.16 | 2.18 |
| Benzyl Alcohol | 5.75 | 5.46 | 5.90 | 5.79 | 5.62 | 5.63 | 6.25 | 6.31 |

TABLE 4G

| Description | Formula 25 Wgt., g | Formula 25 Wgt., % |
|---|---|---|
| Water Zeolite Softened TNK | 84.85 | 84.80 |
| Natrosol 250 HR | 0.75 | 0.75 |
| Monoethanolamine | 0.84 | 0.84 |
| Diisopropanolamine, 90% | 1.22 | 1.22 |
| Triethanolamine | 2.07 | 2.07 |
| Dodecyl Benz Sulfonic Acid 96% IBC (LAS) | 0.94 | 0.94 |
| Sodium Dioctyl Sulfosuccinate, 70% | 1.23 | 1.23 |
| Plurafac SL 62 (Emul./Dispersant) | 2.06 | 2.06 |
| Benzyl Alcohol | 6.06 | 6.06 |

TABLE 4H

| Description | Formula 26 Wgt., g | Formula 26 Wgt., % |
|---|---|---|
| Water Zeolite Softened TNK | 3181.00 | 81.66 |
| Natrosol 250 HR | 38.93 | 1 |
| Monoethanolamine | 177.75 | 4.56 |
| 2-(2-Aminoethoxy)ethanol | 36.79 | 0.94 |
| Dodecylbenzene Sulfonic Acid 96% IBC (LAS) | 109.86 | 2.82 |
| Benzyl Alcohol | 350.89 | 9.01 |

TABLE 4I

| | Formula 27 Wgt., % | Formula 28 Wgt., % | Formula 29 Wgt., % | Formula 30 Wgt., % |
|---|---|---|---|---|
| Water Zeolite Softened TNK | 78.43 | 78.46 | 83.91 | 84.23 |
| Natrosol 250 HR | 0.94 | 0.52 | 0.53 | 0.75 |
| Monoethanolamine | 4.51 | 4.56 | 3.54 | 4.03 |
| Dodecylbenzene Sulfonic Acid 96% IBC (LAS) | 2.80 | 2.84 | 2.66 | 2.25 |
| Sodium Dioctyl Sulfosuccinate, 70% | 1.36 | 1.39 | 1.26 | 0.97 |
| Plurafac SL 62 (Emul./Dispersant) | 2.04 | 2.09 | 2.08 | 0.96 |
| 2-(2-Aminoethoxy)ethanol | 0.94 | 0.94 | | |
| Benzyl Alcohol | 8.99 | 9.20 | 6.02 | 6.84 |

TABLE 4J

| | Formula 31 Wgt., % | Formula 32 Wgt., % | Formula 33 Wgt., % | Formula 34 Wgt., % |
|---|---|---|---|---|
| Water Zeolite Softened TNK | 81.91 | 84.23 | 82.90 | 79.63 |
| Natrosol 250 HR | 0.75 | 0.77 | 0.75 | 1.02 |
| Monoethanolamine | | | 0.91 | 4.62 |
| Diisopropanolamine, 90% | 6.03 | | 4.07 | |
| Triethanolamine | | 4.63 | | |
| Dodecylbenzene Sulfonic Acid 96% IBC (LAS) | 2.48 | 2.92 | 2.28 | 2.71 |
| Sodium Dioctyl Sulfosuccinate, 70% | 1.00 | 1.04 | 0.97 | 1.06 |
| Plurafac SL 62 (Emul./Dispersant) | 1.04 | 1.04 | 0.97 | 1.02 |
| 2-(2-Aminoethoxy)ethanol | | | | 0.96 |
| Benzyl Alcohol | 6.79 | 5.37 | 7.15 | 8.99 |

TABLE 5

Summary of the Evaluation for Emulsification

| Experimental Formulas & Products | Sprayable | Cling Time, s | Emul., mm/min | Vcleaning Time Min. | pH (<11.00) |
|---|---|---|---|---|---|
| Control | Yes | 0 | 2.40 | 0 | 10.59 |
| Formula 1 | Somewhat | 20 | 1.33 | 2.12 | 10.57 |
| Formula 2 | Yes | 8 | 1.67 | 1.97 | 10.53 |
| Formula 3 | Yes | 13 | 0.17 | 1.92 | 10.42 |
| Formula 4 | Yes | 40 | 0.17 | 1.56 | 10.57 |
| Formula 5 | Somewhat | 20 | 0.67 | 6.75 | 9.65 |
| Formula 6 | Somewhat | 36 | 0.17 | >18.0 | 8.41 |
| Formula 7 | Yes | 28 | 0.17 | 9.62 | 10.00 |
| Formula 8 | Somewhat | 13 | 2.63 | 1.70 | 10.61 |
| Formula 9 | Yes | 0 | 5.00 | >10 | 10.85 |
| Formula 10 | Yes | 5 | 2.33 | 1.80 | 10.26 |
| Formula 11 | Yes | 7 | 2.33 | 2.32 | 10.14 |
| Formula 12 | Yes | 5 | 1.67 | 1.92 | |
| Formula 13 | Yes | 14 | 0.17 | 1.83 | 10.85 |
| Formula 14 | Yes | 11 | 0.17 | 2.48 | 10.06 |
| Formula 15 | Yes | 16 | 0.17 | 2.10 | 10.29 |
| Formula 16 | Yes | 10 | 0.17 | 6.08 | 9.35 |
| Formula 17 | Somewhat | 7 | 5.00 | 3.72 | 9.92 |
| Formula 18 | Yes | 2 | 2.33 | 3.73 | 9.59 |
| Formula 19 | Yes | 3 | 0.67 | 0.82 | 10.47 |
| Formula 20 | Yes | 5 | 4.33 | 0.72 | 10.50 |
| Formula 21 | Yes | 5 | 0.79 | 5.28 | 9.24 |
| Formula 22 | Yes | 5 | 2.29 | 5.25 | 9.21 |
| Formula 23 | Yes | 8 | 8.29 | 4.42 | 9.93 |
| Formula 24 | Somewhat | 41 | 0.25 | 2.97 | 10.27 |
| Formula 25 | Yes | 39 | 0.25 | 3.97 | 10.21 |
| Formula 26 | Somewhat | 15 | 1.33 | 1.52 | 10.69 |

TABLE 5-continued

| Summary of the Evaluation for Emulsification | | | | | |
|---|---|---|---|---|---|
| Experimental Formulas & Products | Sprayable | Cling Time, s | Emul., mm/min | Vcleaning Time Min. | pH (<11.00) |
| Formula 27 | Somewhat | 32 | 1.67 | 4.15 | 10.41 |
| Formula 28 | Yes | 44 | 1.67 | 3.97 | 10.48 |
| Formula 29 | Somewhat | 8 | 1.67 | >8.75 | 9.89 |
| Formula 30 | Yes | 6 | 2.00 | 4.42 | 10.65 |
| Formula 31 | Somewhat | 35 | 0.33 | 4.42 | 10.52 |
| Formula 32 | Somewhat | 26 | 0.33 | 2.21 | 10.66 |

Test compositions were evaluated to assess the following criteria: Cleaning Time. Reduced cleaning time of a typical fryer from about 60 minutes to about 25 minutes was desired. This goal can be achieved by developing a product that clings to vertical surfaces and emulsifies and/or disperses any residual fat/oil in the fryer (effective draining and rinsing) and prevents the redeposition of fat/oils and other particles in the fryer.

Vertical Cling time. From the evaluation on this criteria, hydroxyethyl cellulose was found to be one of the preferred rheology modifiers. Other suitable rheology modifiers include a combination of Croda's Sapphire combined with Crodasinic LS-30 and/or CS-30. Emulsification. Although a composition may perform well in breaking down cooked on fryer grease, it might not emulsify/disperse the oil, evidenced by an oily layer floating on both the cleaning solution and rinse water. From the above evaluation, Lutensol TO 8, Aerosol 22 and Multiwet MO-70E-LQ-(AP) were found to be effective emulsifiers in the fryer cleaning compositions.

Personal Protection Equipment (PPE) Requirement. For personal safety considerations a composition that does not require a user to use PPE was also preferred.

Spot Test/Screenings were conducted in the laboratory to measure performance of the experimental compositions. For a spot test, one drop of the experimental cleaning solution was added to stainless steel panels soiled with baked on vegetable oil and allowed to penetrate the soil. These laboratory Spot Test/Screenings to measure cleaning performance of the experimental compositions were used to measure and record the time required for the entire spot to be hydrolyzed. All laboratory screenings were conducted at room temperature without any agitation.

From the results in Table 4, it is apparent that adding a rheology modifier into the control composition (Control vs. Formulation 26) improves cleaning time, but the phase separation is not ideal. Adding Acusol to Formulation 26 improves the composition's sprayability (Formulation 20), but degrades the phase separation. Using Acusol without hydroxyethyl cellulose does not improve cling time (Formulation 19). Comparing Formulations 17 and 18 shows the different effects from one rheology modifier to another, with a preference to hydroxyethyl cellulose. Comparing the evaluation results for Formulations 5-8 shows the effect of DGA and the combination of MEA, DEA, and TEA. DGA decreases cling time and phase separation, but also decreases cleaning time. Without using DGA, instead of using a combination of MEA and other amine obtains a good balance. Triethanolamine alone would not be a good alkalinity source for a fryer cleaning composition. On the other hand, adding an emulsifier, such as Plurafac SL 62 (Emul./Dispersant) together with a rheology modifier such as hydroxyethyl cellulose gives a composition with a good cling time, sprayability, phase separation and no PPE requirement (Formulation 25).

Thus, it is a combination of a rheology modifier for anti-misting and cling, surfactants/emulsifiers/wetting agents, alkalinity source including MEA, potassium carbonate, diisopropanolamine, instead of hydroxide, and solvent system makes fryer cleaning composition a noticeable improvement over the Control, in terms of overall cleaning time. Beneficially, the fryer cleaning compositions can reduce the cleaning time by about half without a burn-out procedure required for the cleaning methods. Comparing the evaluation results for Formulations 24 and 25 to 22 and 23 highlight the importance of the combination. In addition, the disclosed fryer cleaning composition has a lower pH value and therefore safe to use. Some disclosed fryer cleaning composition do not require personal protection equipment for a person to use them. Table 6 shows additional exemplary experimental compositions using diisopropanolamine. Formulations 34 and 35 were found to be good fryer cleaning compositions.

TABLE 6

| Exemplary Formulations with diisopropanolamine included | | | |
|---|---|---|---|
| Description | Formula 33 Wgt., % | Formula 34 Wgt., % | Formula 35 Wgt., % |
| Water Zeolite Softened TNK | 84.72 | 82.81 | 84.99 |
| Natrosol 250 HR | | 0.91 | 0.75 |
| Acusol 820 | 3.09 | | |
| Monoethanolamine | | 0.90 | 0.95 |
| Diisopropanolamine, 90% | 2.16 | 2.01 | 1.22 |
| Triethanolamine | 3.16 | 3.03 | 2.14 |
| Dodecylbenzene Sulfonic Acid 96% IBC (LAS) | 0.95 | 0.97 | 0.99 |
| Sodium Dioctyl Sulfosuccinate, 70% | 0.70 | 1.38 | 1.24 |
| Plurafac SL 62 (Emul./Dispersant) | | 2.01 | 2.06 |
| Benzyl Alcohol | 5.21 | 5.99 | 5.65 |

Example 4

Extended Laboratory experiments were conducted using Formulas 36-40 shown in Tables 7A-7B. These five evaluated formulas were tested adjacent to each other on the walls of a single fryer.

TABLE 7A

| | Formula 36 | | Formula 37 | |
|---|---|---|---|---|
| Description | Wgt., g | Wgt., % | Wgt., g | Wgt., % |
| Water Zeolite Softened TNK | 734.18 | 81.54 | 738.00 | 82.04 |
| Natrosol 250 HR (PA) | 9.12 | 1.01 | 4.91 | 0.55 |
| Monoethanolamine 99% IBC | 41.31 | 4.59 | 40.51 | 4.50 |
| 2,5,7,10-Tetraoxaundecane (TOU) | 0.00 | 0.00 | 54.00 | 6.00 |
| Dodecylbenzene Sulfonic Acid 96% IBC | 25.56 | 2.84 | 25.62 | 2.85 |
| Benzyl alcohol pure NFXVII DRM | 81.06 | 9.00 | 27.53 | 3.06 |
| 2-(2-Aminoethoxy)ethanol DRM | 9.10 | 1.01 | 8.92 | 0.99 |

TABLE 7B

| Description | Formula 38 Wgt., g | Wgt., % | Formula 39 Wgt., g | Wgt., % | Formula 40 Wgt., g | Wgt., % |
|---|---|---|---|---|---|---|
| Water Soft, 0 gpg | 733.06 | 81.20 | 716.99 | 81.38 | 81.28 | 80.89 |
| Natrosol 250 HR | 8.92 | 0.99 | 6.75 | 0.77 | 0.53 | 0.53 |
| Potassium Carbonate, 47% | 2.78 | 0.31 | 2.44 | 0.28 | 0.67 | 0.67 |
| Monoethanolamine | 11.35 | 1.26 | 36.05 | 4.09 | 3.11 | 3.10 |
| Propylene Glycol | 16.66 | 1.85 | — | — | — | — |
| Ethylene Glycol Phenyl Ether (EPh) | 25.62 | 2.84 | — | — | — | — |
| 2,5,7,10-Tetraoxaundecan (TOU) | 45.08 | 4.99 | 36.02 | 4.09 | — | — |
| Formaldehyde Dibutyl Acetal | — | — | — | — | 4.15 | 4.13 |
| Lauryl Dimethyl Amine Oxide 30% | 24.48 | 2.71 | 10.32 | 1.17 | 2.33 | 2.32 |
| Sodium Dodecyl Diphenyl Oxide Disulfonate, 45% | 24.82 | 2.75 | 20.28 | 2.30 | 2.34 | 2.33 |
| Benzyl Alcohol | 10.00 | 1.11 | 52.20 | 5.92 | 6.05 | 6.02 |

These tests were done by first draining the fryer (cool or warm/hot), spraying the test product onto the fryer's surface at a rate of about 4 oz. per fryer and until the entire surface was covered, mixing the chemistry and surface oil with a specialized tool in order for the tested composition to dwell on the surface for up to ten minutes. These steps were then followed by working the solutions into the soil using a brush, scooping the soil from the fryer bottom and rinsing. Visual observations of the fryer before, during, and after cleaning with the experimental composition were made. Cleaning with a composition with hydroxyethyl cellulose demonstrated beneficial cleaning efficacy according to embodiments of the methods and compositions.

Example 5

Further extended laboratory experiments were conducted using Formula 16 and Formula 24 on a commercial scale fryer and applied at an application rate of 4 oz./fryer. The criteria for successful formulation was set at a 100% soil removal (described as a 'lifting' of soil) from the surface and ready for rinse step. The test followed the procedures/steps set forth in Example 4.

Visual observations of the dirty fryer before cleaning were made and compared to the fryer after contact with the evaluated formula for 10 minutes and scrubbing showing lifting of the soils (wherein the 10 minutes was total cleaning time including contact, soil penetration and scrubbing). The evaluated formulas require an increased cleaning time to provide 100% soil removal and therefore would not provide rapid cleaning required for a PPE free formulation.

Example 6

Additional testing on commercial fryers were completed to assess the reduction in cleaning time that could be achieved for fryers when compared to commercially-available caustic boil-out formulations. The composition in Table 8 was evaluated at 11 distinct locations each using a Control cleaning composition, such as a boil-out caustic cleaning composition and other commercially-available fryer cleaners were compared.

TABLE 8

| Description | Formula 41 Wgt., % |
|---|---|
| Water Soft, 0 gpg | 80-85 |
| hydroxyethyl cellulose | 0.5-1.0 |
| Monoethanolamine | 2-5 |
| Sodium dioctyl Sulfosuccinate 70% | 0.5-1.5 |
| Alkoxylated Linear Alcohol | 0.5-1.5 |
| Dodecyl Benz Sulfonic Acid 96% | 2-3 |
| Benzyl Alcohol | 6-8 |
| Dye | <1 |
| Total | 100 |

TABLE 9

| Location | Control Product (Condition) | Cleaning Frequency | Estimated % Time Sayings | Commercial Feedback |
|---|---|---|---|---|
| 1 | Control Table 3 (2-5 minute boil) | 3-4 days | 33% | Cleaner results with faster cleaning |
| 2 | Control Table 3 (2-5 minute boil) | 3-4 days | 0% | Cleaner results with safer cleaning |
| 3 | Control Table 3 (5-10 minute boil) | 3-4 days | 28% | No significant change |
| 4 | Control Table 3 (15-20 minute boil) | 14 days | 44% | Cleaner results with faster cleaning |
| 5 | Control Table 3 (15-20 minute boil) | 2 days | 43% | Cleaner results with faster cleaning |
| 6 | Control Table 3 (15-20 minute boil) | 3-4 days | 9% | No significant change |
| 7 | Control Table 3 (15-20 minute boil) | 14-30 days | 26% | No significant change |
| 8 | Dawn Dish Soap | 3-4 days | 0% | Cleaner results |
| 9 | Commercial Control B | 7 days | 50% | Safe cleaning and faster cleaning |
| 10 | Commercial Control A | 2 days | 50% | Easier cleaning and safer cleaning |
| 11 | Magnesol Magiclean Boil Out | 7 days | 0-25% | Cleaner results and easier cleaning |

The results provided by consumer measurement in comparison to the control cleaning on the frequency provided was collected and provided in Table 9. The percent of time saving (i.e. faster cleaning using the fryer composition) was reported in comparison to the time of cleaning required for the control product. Additional commercial feedback was provided demonstrating an overall subjective improvement in cleaning in most locations where the formulations were evaluated.

Example 7

Viscosity testing was completed to demonstrate whether a pseudoplastic formulation was developed to provide adequate vertical cling time which is needed for complete cleaning of fryers. Composition 41 (Table 8) was evaluated under various shear to assess thinning and therefore pseudoplasticity. The results are shown in Table 10.

TABLE 10

| Speed, rpm (Shear Rate) | Viscosity, cP | Spindle # |
|---|---|---|
| 2.0 | 975 | 1 |
| 2.5 | 972 | 1 |
| 4.0 | 935 | 1 |
| 5.0 | 944 | 1 |
| 10.0 | 859 | 1 |
| 20.0 | 792 | 2 |
| 50.0 | 626 | 2 |
| 100.0 | 523 | 3 |

The results show thinning/less viscosity as the shear rate increases which confirms a pseudoplastic compositions is achieved. For a sufficient vertical cling of the fryer compositions a viscosity of at least 500 cP is preferred. In an embodiment, for both vertical cling and dispensing a viscosity between about 500 cP and 1300 cP is preferred. The resultant values are ideal for spraying and thus capable of clinging to a vertical surface which allows sufficient contact time for soil penetration.

Example 8

Emulsifying tests were conducted to evaluate the ability of the fryer composition (Composition 41) to emulsify oils and soils to demonstrate cleaning ability. 50 g vegetable oil colored with Sudan blue was added to 50 g test solution (2% active (dilution of RTIU) & Ready-To-Use formulation of Composition 41) in 5 grain US water. The mixture was stirred for 2 minutes at 1200 rpm in a 400 mL beaker after which each solution was transferred to 250 mL graduated cylinder. Each cylinder was observed for phase separation at 0, 6 and 10 minutes and compared to a commercial control.

A 0 minutes (immediately after stirring), the Composition 41 at 2% (w/w) showed less water (clear/cloudy phase) than the control, which indicates better emulsification.

At 6 minutes the Composition 41 Ready-To-Use (RTU) continues to show a single phase while the control (also RTU) has formed two distinct phases (ca. 70 mL). The fryer Composition 41 clearly shows more effective emulsification than the control at six plus minutes of standing.

The Composition 41 after 10 minutes at Ready-To-Use (RTU) still shows a single phase while the control (also RTU) has formed two distinct phases. Again after 10 minutes the Composition 41 clearly shows more effective emulsification than the control.

Example 9

Figure 2:
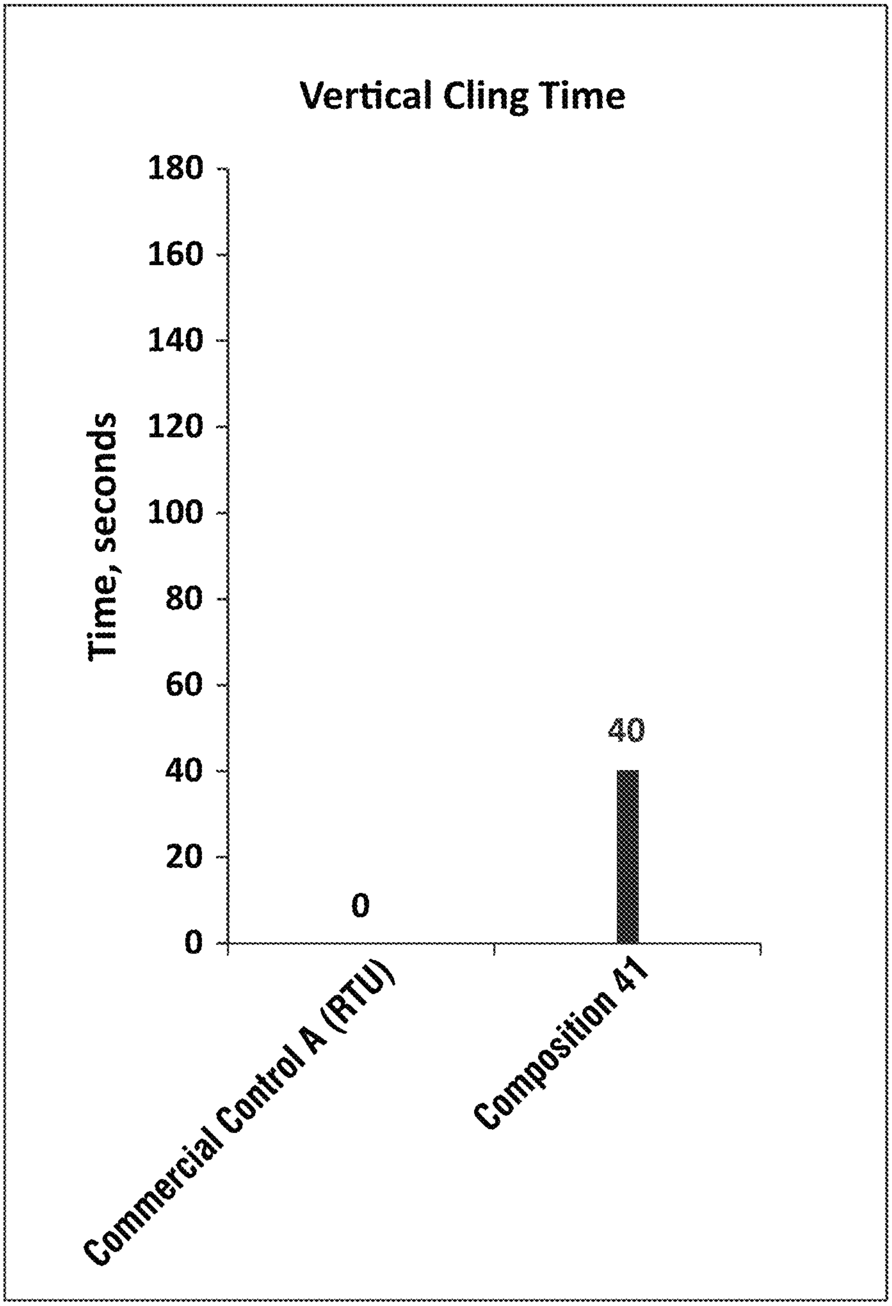
FIG. 2 shows a graph comparison of cling time (minutes) of an exemplary formulation for fryer cleaning compared to a Commercial Control.

Comparative testing was conducted to assess improvements in formulation (Composition 41) compared to a commercially-available fryer cleaner (Commercial Control A) both at RTU dilutions. FIG. 1 shows a graph comparison of cleaning time (minutes) of Composition 41 compared to Commercial Control A. The cleaning time of Commercial Control A is shown as 0 minutes as the composition is unable to adhere/cling to the vertical fryer surface. Similarly, FIG. 2 shows a graph comparison of cling time (minutes) of Composition 41 compared to Commercial Control A, where again the Commercial Control A is unable to adhere/cling to the vertical fryer surface due to the lack of rheology modification as set forth in the compositions. The 40 minute cling time for the Composition 41 demonstrates a marked improvement in formulation to adhere the composition to a heavily soiled surface and remove such soils.

Figure 3:
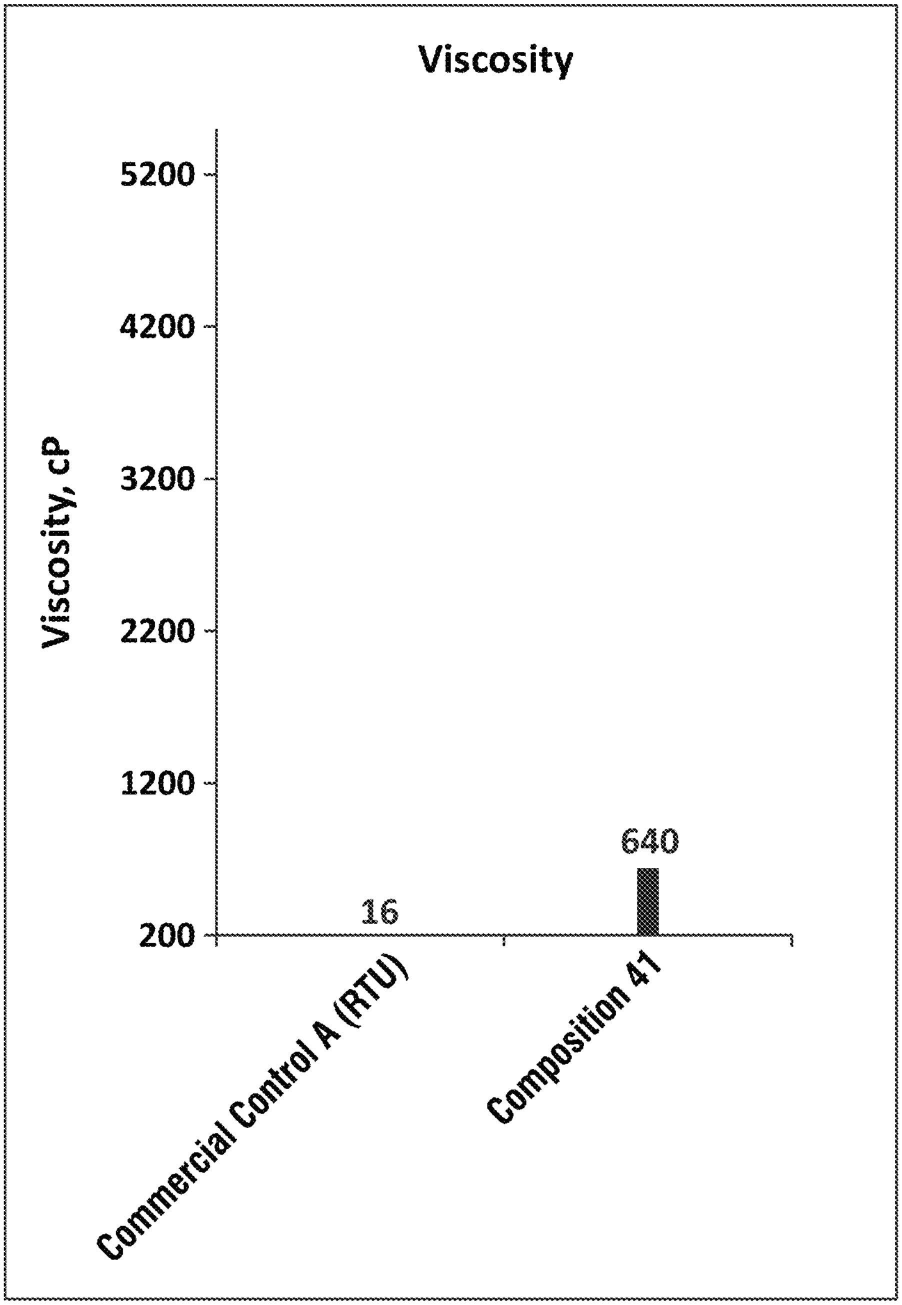
FIG. 3 shows a graph comparison of viscosity (cP) of an exemplary formulation for fryer cleaning compared to a Commercial Control.

FIG. 3 shows a graph comparison of viscosity (cP) of Composition 41 compared to Commercial Control A which depicts a non-readable value (measured result was 15 cP). The viscosity of 640 cP of Composition 41 demonstrates sufficient viscosity to be dispensed while able to maintain or adhere to a surface in need of treatment.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A cleaning composition that clings to surfaces and penetrates greasy soils comprising:

from about 0.5 wt-% to about 1.0 wt-% of a hydroxyethyl cellulose rheology modifier;

from about 2 wt-% to about 5 wt-% of at least one alkalinity source that is monoethanolamine, diisopropanolamine, triethanolamine, and/or 2-(2-aminoethoxyl)ethanol;

from about 3 wt-% to about 6 wt-% of a combination of emulsifiers comprising an alcohol alkoxylate non-ionic surfactant, a sulfosuccinate anionic surfactant, and a sulfonic acid or a sulfonate salt of a sulfonic acid anionic surfactant;

from about 6 wt-% to about 8 wt-% of a benzyl alcohol solvent; and from about 80 wt-% to about 85 wt-% of water and/or other carrier, wherein the composition has a pH less than about 11.5.

2. The composition of claim 1, wherein the composition is substantially-free of volatile organic compounds and/or wherein the composition is safe to handle without mask or gloves.

3. The composition of claim 1, wherein the alkalinity source is a single non-caustic monoethanolamine alkalinity source.

4. The composition of claim 1, wherein the cleaning composition does not include bleaching agents.

5. The composition of claim 1, wherein the cleaning composition is substantially free of phosphates, phosphorous, and phosphonates.

6. The composition of claim 1, wherein the cleaning composition has a flash point of greater than about 100° C. and a vapor pressure less than 0.1 mmHg at 20° C.

* * * * *